United States Patent [19]

Stapleton

[11] Patent Number: 5,416,544
[45] Date of Patent: May 16, 1995

[54] CAMERA LENS ATTACHMENT TO AID FOCUSING

[76] Inventor: Michael E. Stapleton, 143 Hillbrook Dr., Los Gatos, Calif. 95032

[21] Appl. No.: 163,653

[22] Filed: Dec. 7, 1993

[51] Int. Cl.⁶ .............................................. G03B 29/00
[52] U.S. Cl. .................................... 354/81; 354/293; 354/295
[58] Field of Search .......................... 354/81, 293, 295; 352/243; 355/21, 39, 47, 52

[56] References Cited

U.S. PATENT DOCUMENTS 5,285,226  2/1994  Frosig et al. .......................... 354/81

Primary Examiner—Howard B. Blankenship
Attorney, Agent, or Firm—Keith Kline

[57] ABSTRACT

An attachment for the lens of a camera to facilitate macro photography. The device comprises a clear plastic tube, manufactured to the precise length required to achieve 1:1, or other desired close-up ratio, focusing for a given camera. The plastic tube is provided with a step-up ring at one end to provide a means for threaded attachment to the camera lens. The device is then screwed onto the lens of a camera to take close range photos.

4 Claims, 2 Drawing Sheets

CAMERA LENS ATTACHMENT TO AID FOCUSING

FIELD OF THE INVENTION

The present invention relates generally to photographic equipment, and more particularly is a lens attachment that facilitates focusing a camera for very close shots.

BACKGROUND OF THE INVENTION

One problem area in photography is "macro" photos—photos taken at very close range. One area in which this problem often arises is the field of law enforcement. Specifically, law enforcement officials are often called upon to take 1:1 (actual size) photographs of evidentiary items. Fingerprint photos are the most common usage of 1:1 photography in this field.

The problem in this sort of picture taking arises because most cameras can only be focused to a distance of approximately three feet. For fingerprint photography, this is not acceptable.

Cameras can be modified, e.g. by the addition of a macro lens, so as to be able to focus at these close ranges, but it is still very difficult to hold the camera in the proper position to achieve a focused shot at a range of 3–4 inches.

Current art devices are limited in that they generally require, at the very least, a diopter lens to achieve proper focusing. This type of device leads to "vignetting" (fringe interference), and does not provide the quality sought for many applications.

OBJECTS, SUMMARY, AND ADVANTAGES OF THE INVENTION

Accordingly, it is an object of the present invention to provide a device that allows a camera to be focused at very close range for macro photography.

It is a further object of the present invention to provide a device that will not require the uses of any additional lenses to focus for 1:1 shots.

The present invention is a device that is attached to the lens of a camera to facilitate macro photography. The device functions in conjunction with a macro lens, and comprises a clear plastic tube, manufactured to the precise length required to achieve 1:1, or other desired close-up ratio, focusing for a given camera. The plastic tube is provided with a step-up ring at one end to provide a means for threaded attachment to the camera lens. The device is then screwed onto the lens of a camera to take close range photos.

While there are numerous applications for the present invention, this specification will be directed chiefly to the area of fingerprint photography.

An advantage of the present invention is that it provides automatic focusing at very close range for 1:1 photos.

A further advantage of the present invention is that it provides a device that serves as a tripod for the camera, so that the operator does not have to hold the camera. This feature also allows the user to take time lapse shots of the subject, since the camera can simply be placed in the proper position and left in place during the desired time period.

Still another advantage of the present invention is that due to the clear plastic side walls of the device, light can be metered with the device in place. Further, the subject of the photo can be clearly seen with the device in place.

Finally, the present invention allows the subject of the photo to be framed by the lens extension, yet the circumference of the device is sufficient so that the edge of the device does not appear in the photo.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
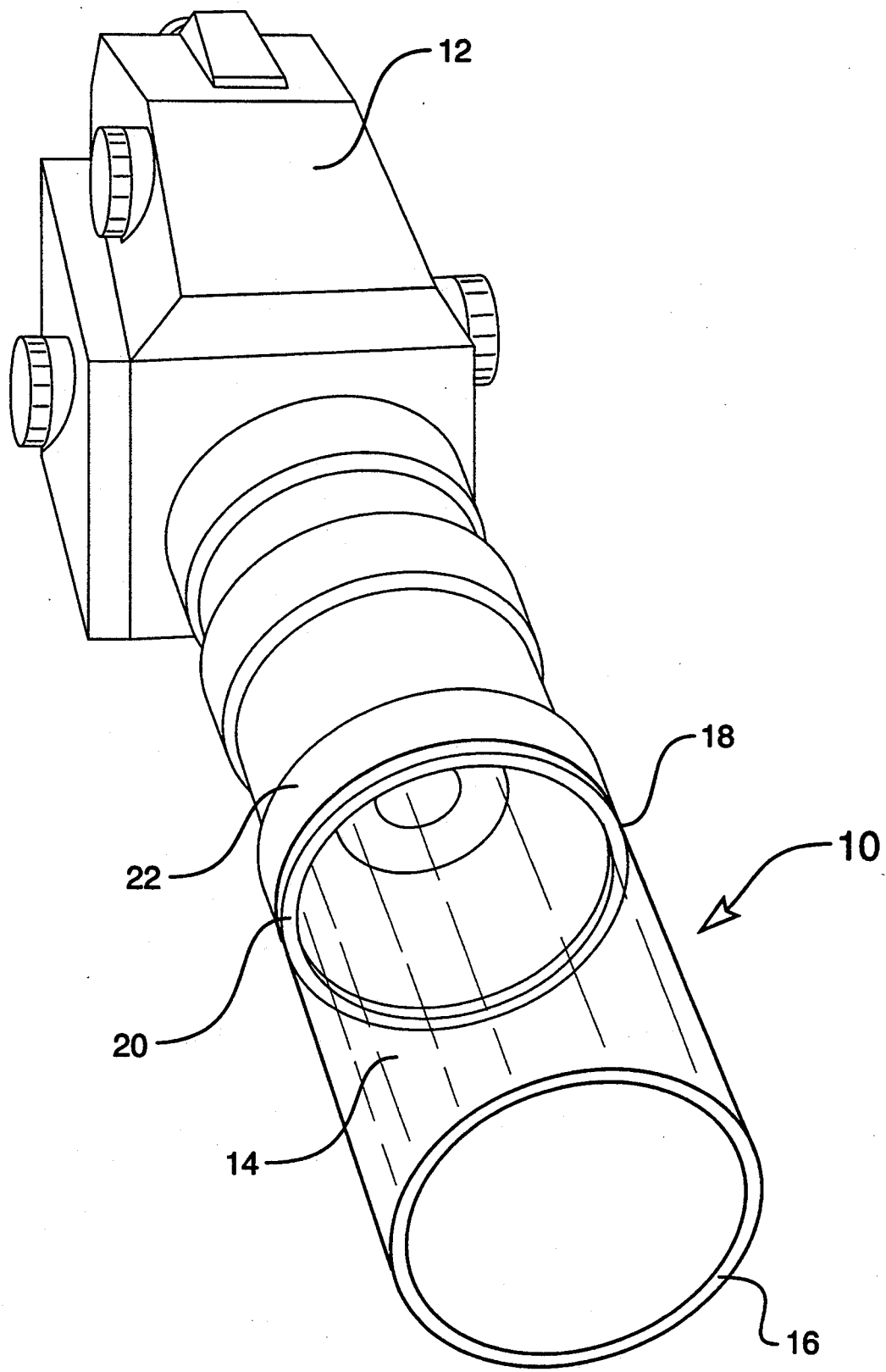
FIG. 1 is a perspective view of the device of the present invention attached to a camera.
Figure 2:
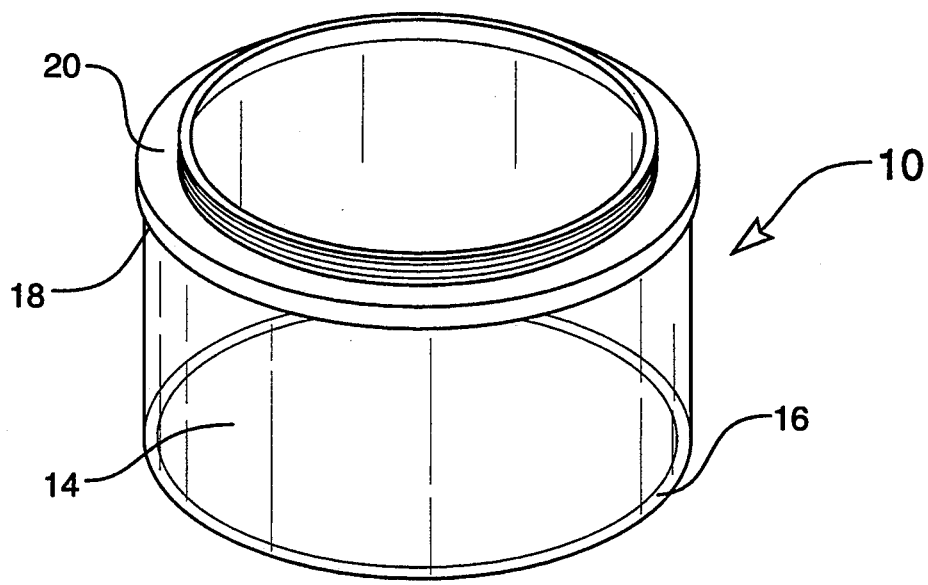
FIG. 2 is a perspective view of the device of the present invention detached from the camera.

The present invention is a lens attachment 10. The attachment 10 is used to ensure that a camera 12 is properly focused for macro photography. A body 14 of the attachment 10 is a rigid, tubular element. In the preferred embodiment, the body 14 is comprised of clear plastic to allow light to pass through the walls. This enables a user to see the subject of the photograph while the device is in place. The clear body 14 also allows the user to meter light without moving the camera 12 and attachment 10.

A first end 16 of the body 14 is open. The edge of the first end 16 may be rounded slightly for the safety and convenience of the user. A second end 18 of the body is permanently affixed to a threaded attaching element, a step-up ring 20. The attaching element 20 will generally be glued to the body 14.

The attaching element 20 is selected so that the threaded portion of the attaching element 20 is suitable for attachment to a camera lens 22. Equipping a camera lens with threads to accept various attachments is standard procedure in the photography industry.

In use, the attachment 10 is screwed onto the camera 12 as shown in FIG. 1. The camera 12 is then placed so that the attachment 10 is flush against the surface containing the subject to be photographed. The attachment 10 frames the subject, and fixes the distance to the camera lens 22.

If a time exposure is desired, the camera is simply left in place, resting on the attachment 10, for the desired amount of time. The rigid body 14 of the attachment 10 ensures that a proper distance is maintained from the camera lens 22 to the subject of the photograph. In this capacity, the attachment 10 acts as a built-in tripod for the camera 12.

One specific application of the attachment 10 is in the forensic area, specifically in the photography of fingerprints. One of the cameras used by some law enforcement agencies for this purpose is the Mamiya 645 with f/4 macro lens and spacer. For this specific application, the following dimensions are applicable for the attachment 10: The length of the body 14 of the attachment 10 is $3\frac{7}{8}$ inches. The outer diameter of the body 14 is 3 inches, with a wall thickness of $\frac{1}{4}$ inch, yielding an inner diameter of $2\frac{1}{2}$ inches.

It should be recognized that many variations of the preferred embodiment will be used in practice. Dimensions are Clearly dependent on the particular camera to be used. Various materials may be used for the body 14, including non-transparent materials if desired.

ALTERNATE EMBODIMENT

Figure 3:
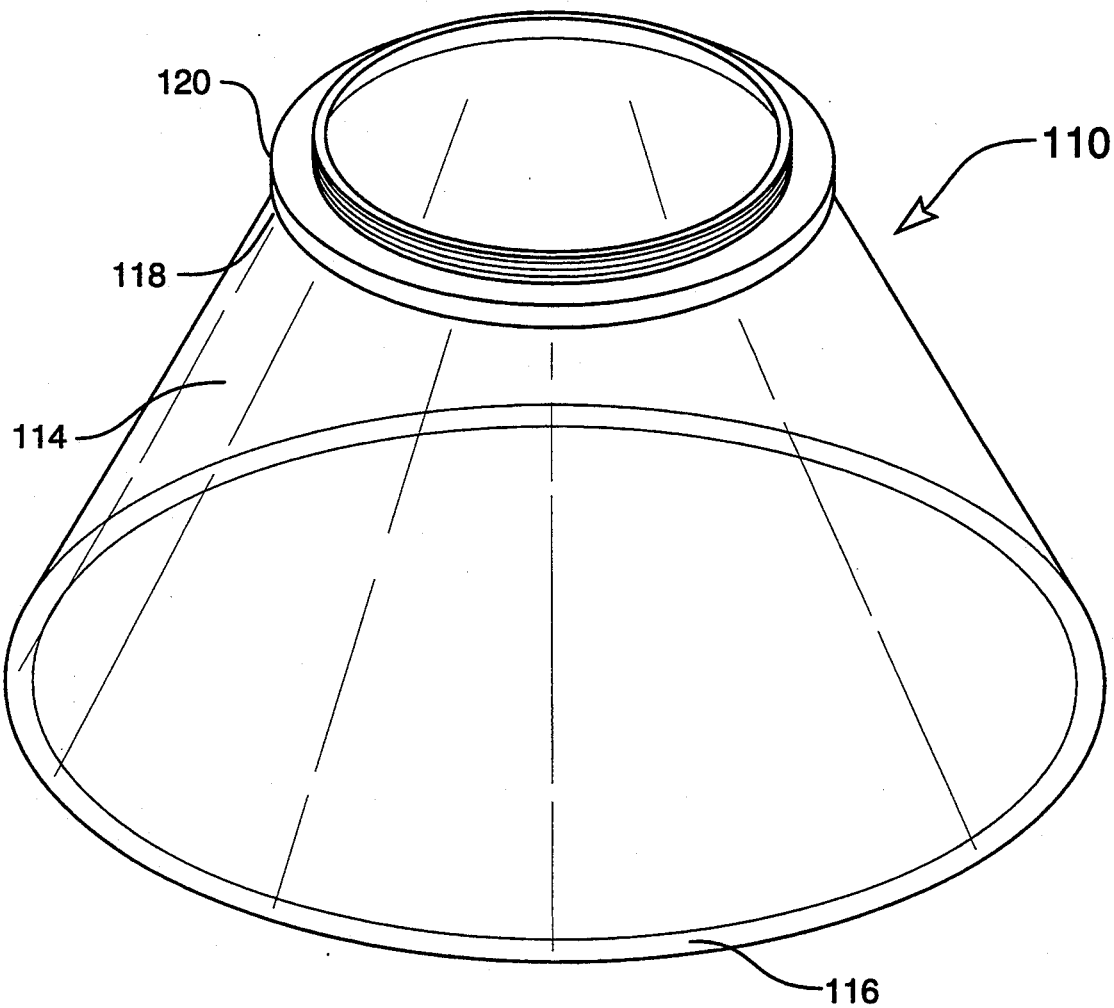
FIG. 3 is a perspective view of an alternate embodiment of the present invention.

FIG. 3 illustrates a first alternative embodiment 110 of the present invention. Reference numbers for corresponding element will differ from elements specified for the preferred embodiment by 100.

This alternative embodiment of the attachment 110 is used when even more detailed photographs are desired. The attachment 110 is used when 1:2 reproduction is desired. An attachment body 114 is tapered so that a larger subject framing area, defined by a first end 116, is created. All other aspects of the construction of the device remain the same.

Again, for the specific embodiment of a Mamiya 645 with f/4 macro lens and spacer, the following dimensions apply: The first end 116 of the attachment 110 has an outer diameter of 6 inches. The walls of the body 114 are ¼ inch thick, and tapers down to the second end 118, attached to the user's camera, with an outer diameter of 3 inches.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A camera lens attachment device comprising:

a tubular body formed from a clear plastic with sufficient tensile strength to support the weight of a camera, and an attaching element permanently affixed to one end of the tubular body; wherein the attachment is adapted to be removably attached to a camera lens by the attaching element so that the lens attachment serves as a tripod, the tubular body being formed to a length so that the camera will be properly focused on a subject to create a 1:1 image reproduction when a free end of the lens attachment is placed on the same surface as the subject.

2. The lens attachment device of claim 1 wherein:
    the attaching element is a threaded step-up ring.

3. A camera lens attachment device comprising:

a main body formed from a clear plastic with sufficient tensile strength to support the weight of a camera, the body tapering outward from a first end to a second end, and an attaching element permanently affixed to the first end of the main body; wherein the attachment is adapted to be removably attached to a camera lens by the attaching element so that the lens attachment serves as a tripod, the main body being formed to a length so that the camera will be properly focused on a subject to create a 2:1 magnification of the subject when the second end of the lens attachment is placed on the same surface as the subject.

4. The lens attachment device of claim 3 wherein:
    the attaching element is a threaded step-up ring.

* * * * *